United States Patent [19]
Phillips

[11] Patent Number: 4,840,529
[45] Date of Patent: Jun. 20, 1989

[54] ADJUSTMENT LOCK

[76] Inventor: Donald A. Phillips, 2909 S. Logan, Lansing, Mich. 48910

[21] Appl. No.: 85,758

[22] Filed: Aug. 17, 1987

[51] Int. Cl.⁴ .................... F16B 23/00; F16B 35/00
[52] U.S. Cl. .................................. 411/397; 411/275; 411/393; 411/384; 403/320
[58] Field of Search ............... 411/230, 226, 274, 275, 411/264, 291, 292, 290, 286, 325, 393, 948, 383, 384, 397; 403/320, 343, 362

[56] References Cited
U.S. PATENT DOCUMENTS 1,850,917  3/1932  Browne ........................ 411/275
3,176,745  4/1965  Nyborg ........................ 411/275
4,536,115  8/1985  Helderman .................... 411/397

FOREIGN PATENT DOCUMENTS 2066401  7/1981  United Kingdom ............... 411/383

Primary Examiner—Neill R. Wilson
Attorney, Agent, or Firm—Miller, Morriss & Pappas

[57] ABSTRACT

A safety lock for adjustment locking structures in which a set screw is passed longitudinally through a jam screw element at a position off-center from the axis and parallel to the axis of the jam screw and locking the jam screw against the end of the coaxially adjacent element in the adjustment stack.

2 Claims, 1 Drawing Sheet

ADJUSTMENT LOCK

The present invention relates to a new and improved adjustment locking mechanism for jam-lock structures especially useful in rocker arm assemblies as, for example, found in adjustment of valve lash clearances. The present invention may be viewed as a new and reliable safety lock. In other respects, the present invention comprises a set screw longitudinally through a jam element such as a jam screw and offset from the axis of the jam element and especially useful in adjusting an axial stack of threaded elements as where one stud is capped by an adjusting sleeve running threadably over the threads of the stud and a lock or jam screw is threadably and axially insertable in the threaded sleeve thereby engaging and jamming the end of the stud in a blocking engagement. Such blocking adjustment with prior transverse or axial locking is wellknown but safety or double locking of the threaded blocking element has presented substantial mechanical problems, especially in the precision adjustment of high performance vehicles at the rocker arms for the valves. The vibrating action or kinetic environment and the repetitive oscillatory motion requires a more positive lock than heretofore available. The present invention provides such a new axially offset lock in a most simple and unobvious construction. The safety lock of the present invention achieves the desired locking without radical redesign and without complex mechanical structure which, of itself, could introduce weight or mass and consequent structure and dynamic imbalance problems.

Accordingly, one of the principal objects of the present invention is to provide a new safety lock in axial threaded engagement blocking or jamming systems.

Another object is to provide such a lock without structural complications.

Still another object is to achieve high precision adjustment of threadably adjustable elements by means of an offset set screw in which the offset is axially parallel but off-set from the axis of the threaded lock or jam screw.

The present structure applies the compression from the threads to tensioning of the related threaded elements to accomplish an excellent locking strain that does not achieve axial displacement of the lock elements but eliminates chance release of the selected setting over long operational periods and is substantially outside of inertial and kinetic imbalances.

Finally, the solution to the problem of jam locking goes beyond the ordinary knowledge in the art and provides an economical solution to recurrent locking problems in analogous apparatus uses.

IN THE FIGURES

GENERAL DESCRIPTION

In general, the present invention is a safety lock for threaded jam lock devices in which threaded elements such as a set screw is provided in offset axial relation to an axially stacked group of jam threaded elements so that the set screw extends through one of the jam threaded elements and impinges against another of the jam threaded elements. This secures the adjusted jam relation.

In jam threaded stacks of jam locked structures on a common axis, it has been known to provide set screws that transversely engage and interlock the adjusted and adjusting elements. No structures for jamming the threaded elements are known which follow within the cylindrical limits of the jamming elements to provide a security offset from the axis of the stack. In the present invention, a jam screw is engageable in end-to-end relation against a stud in a common threaded sleeve structure, for example, and both jam screw and stud are in axial alignment. Then a set screw offset from the axis of the stack is provided in a threaded opening which passes longitudinally through one of the jam elements as the jam screw. In such an arrangement, a threaded sleeve receives both stud and jam screw for jamming contacting alignment and provides a confining tension sleeve to the stack that is double locked by the axially offset set screw.

The need for such a lock has been long felt and the simplicity of the present adjustment lock is readily appreciated by hindsight but has not been available prior to the present invention.

SPECIFIC DESCRIPTION

Figure 1:
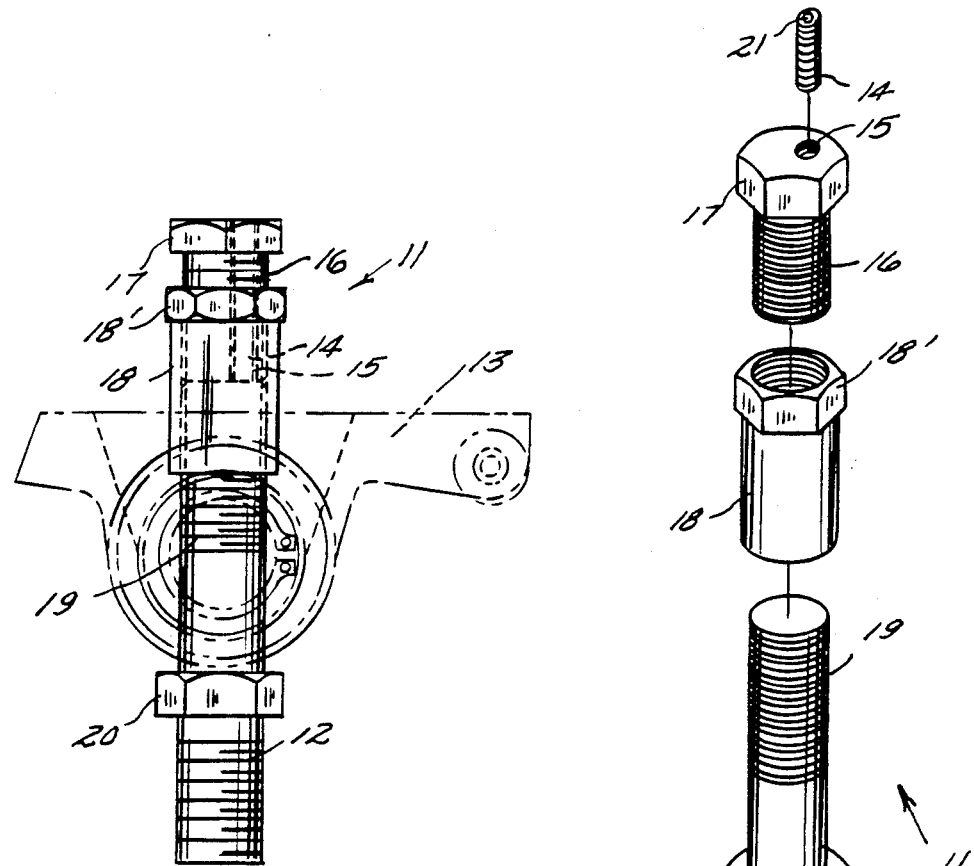
FIG. 1 is a side elevation view of an adjustment lock in accord with the present invention and shown in adjustment of valve lash clearance in a rocker arm for high performance internal combustion engines.

Referring to the drawing and first to the FIG. 1 thereof, the present invention is revealed in a typical use setting as a vale adjustment lock structure 11 in a rocker arm combination as found in internal combustion engines or compressors. The adjustment lock 11 is seen coaxially related to the support stud 12 for the rocker arm (phantom line) 13. The adjustment lock 11 comprises a set screw 14 which is threadably movable in a threaded opening 15 through the length of a jam screw 16. The screw 16 is shown with a hexagonal head 17. The opening 15 is offset from the principal axis of the jam screw 16 but is parallel to the principal and longitudinal axis thereof. The adjusting sleeve 18 with its integral turning collar 18' is internally threaded for its entire length and threadably receives the threaded extension 19 of the stud 12. By means of the collar 18', the sleeve 18 is threadably adjustable in relation to jam screw 16 and stud 12. The stud 12 usually includes a hexagonal or rectangular turning head or grip portion 20 permitting the stud 12 to be secured in, for example, an engine block (not shown). The stud 12, the sleeve 18 and the jam screw 16 comprise a typical jam locked adjustment stack.

Figure 2:
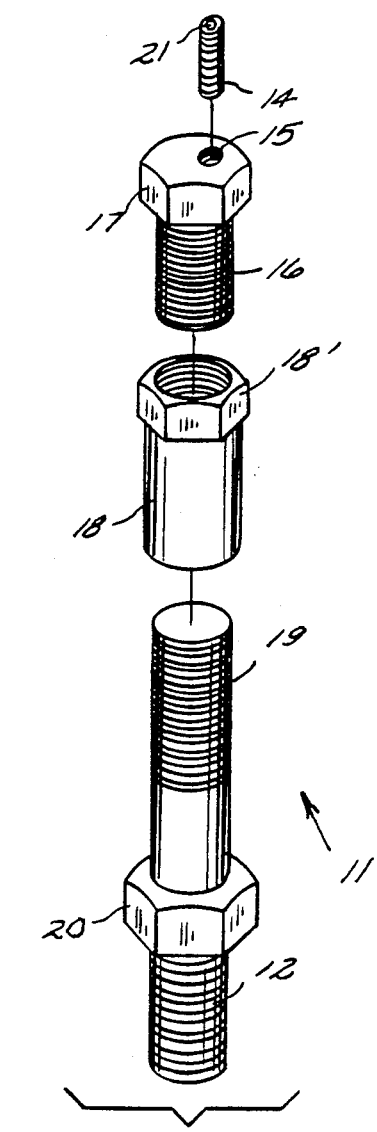
FIG. 2 is a perspective exploded view of the assembly of lock elements in the structure of FIG. 1 and indicating their disassembled relationship.

In FIG. 2 the set screw 14 is shown poised for entry into the axially offset threaded opening 15 through the jam screw 16. The threaded adjusting sleeve 18 is shown in axial relation to the jam screw 16 and the threaded extension 19 of the coaxial stud 12. This arrangement is in sequence position (top to bottom) as set out in the FIG. 1.

Figure 3:
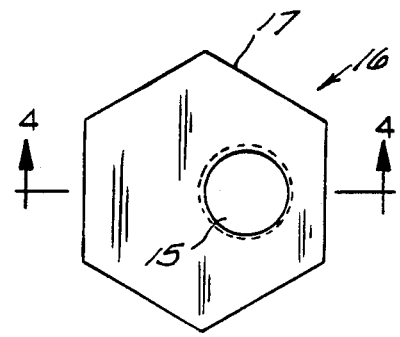
FIG. 3 is a top plan view of one of the threaded jam lock elements in the present invention and indicating the location of the parallel offset positioning of the security lock insert.

In FIG. 3 the threaded opening 15 is clearly shown offset from the axis of the jam screw 16 and the opening 15 provides access to the set screw 14 which is driven into engagement with the stud 12 when the jam screw 16 is in jam lock position in the sleeve 18.

Figure 4:
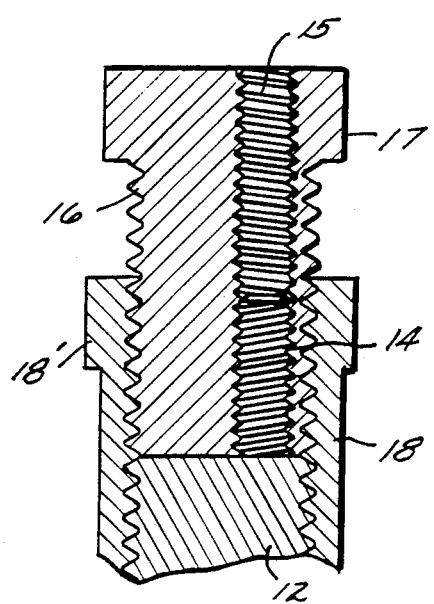
FIG. 4 is a cross section elevation view taken on the line 4—4 of FIG. 3 and indicating the security set screw in offset parallel relation to the axis and impinging against the mounting stud.

In FIG. 4 the locked arrangement of the present invention is illuminated in partial section view through the sleeve 18. The end of the stud 12 which meets the jam screw 16 is in compression relation with the jam screw 16. Then the set screw 14, shown with recessed head or socket 21, is run into the threaded opening 15 engaging and gripping the stud 12 in the off-axis position, as indicated, secure against relative turning.

This arrangement effectively safety locks the jam screw 16 against the stud 12 and the adjusting sleeve 18 is secured against the threaded elements in the adjustment stack. In reverse order, the stack is relaxed and a new adjustment can be made, the final lock occurring upon the fixing of the set screw 14 against the stud 12 in prevention of any relative turning of the jam screw 16 or stud 12 in the sleeve 18.

Effective and economically fabricated safety locks for axial adjustment systems are thus made available. Their use prevents accidental vibrational related deviation in adjustment control and assures a double lock in jam stacked situations.

While hexagonal head-like portions are indicated to provide wrench grips, those may be square, rectangular, or in other configurations and the jam screw 16 may have, for example, a recessed socket-like head where desired by reason of clearance or other reasons.

In most instances, the threaded elements in the present invention are fabricated from steel. However, where greater or lesser strengths are required, plastic, aluminum, brass, iron, selected alloys, or other combinations of materials may be used without departing from the spirit of the invention.

Having thus described my adjustment lock or safety lock, others in the art may perceive other modifications of these devices and such modifications, changes or improvements within the skill of the art are intended to be included herein limited only by the scope of my hereinafter appended claims.

I claim:

1. A jam lock security structure for rocker arms in adjustment of valve lash clearance, the combination comprising:

a threaded stud;

a threaded sleeve threadably moveable and locatable on the axis of said stud;

a threaded jam element threadably insertable and removable from said threaded sleeve and axially engageable against the end of said stud at a position established by the position of said sleeve and said jam element defining a threaded opening offset from the and parallel to the axis of said jam element; and a threaded set screw selectively positionable in said opening offset from said axis of said jam element and engageable with said stud upon final positioning of said sleeve element by said jam element and stress locking said jam elements in selected position.

2. A jam lock securing structure comprising:

a threaded jam lock element;

a selectively movable threaded sleeve adjustment element into which said jam lock element is threadably insertable at one end;

a threaded stud post element upon which said threadable sleeve is threadably moveable; and a set screw threadably engageable in a threaded opening offset from the axis of said jam lock element and through said jam lock element and selectively engageable with the end of said stud post element.

* * * * *

UNITED STATES PATENT AND TRADEMARK OFFICE
CERTIFICATE OF CORRECTION

PATENT NO. : 4,840,529

DATED : June 20, 1989

INVENTOR(S) : Phillips, Donald A.

It is certified that error appears in the above-identified patent and that said Letters Patent is hereby corrected as shown below:

Column 4, Line 18, Claim 1, delete "the" after "from".

Signed and Sealed this

Twentieth Day of February, 1990

Attest:

JEFFREY M. SAMUELS

Attesting Officer     Acting Commissioner of Patents and Trademarks